United States Patent
Lee et al.

(10) Patent No.: US 9,436,040 B2
(45) Date of Patent: Sep. 6, 2016

(54) LIQUID CRYSTAL DISPLAY DEVICES AND METHODS OF MANUFACTURING THE SAME

(71) Applicant: Samsung Display Co., Ltd., Yongin, Gyeonggi-Do (KR)

(72) Inventors: Taek-Joon Lee, Hwaseong-si (KR); Tae-Jin Kong, Bucheon-si (KR); Sang-Gyun Kim, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/531,098

(22) Filed: Nov. 3, 2014

(65) Prior Publication Data

US 2015/0346557 A1    Dec. 3, 2015

(30) Foreign Application Priority Data

May 28, 2014    (KR) .......................... 10-2014-0064159

(51) Int. Cl.
*H01L 21/00*    (2006.01)
*G02F 1/1337*    (2006.01)

(52) U.S. Cl.
CPC ... *G02F 1/133723* (2013.01); *G02F 1/133753* (2013.01); *G02F 1/133788* (2013.01); *G02F 2001/133742* (2013.01); *G02F 2001/133761* (2013.01)

(58) Field of Classification Search
CPC ....... G02F 1/1313; G02F 1/01; G02F 1/1334
USPC .................. 438/28–30; 257/59; 349/10, 128
See application file for complete search history.

(56) References Cited

U.S. PATENT DOCUMENTS

| | | | |
|---|---|---|---|
| 2007/0092743 A1 | 4/2007 | Yun et al. | |
| 2007/0154657 A1* | 7/2007 | Sha | G02F 1/133753 428/1.6 |
| 2008/0160222 A1* | 7/2008 | Harding | B82Y 30/00 428/1.26 |
| 2012/0218500 A1* | 8/2012 | Nakamura | G02F 1/133711 349/128 |
| 2013/0050624 A1 | 2/2013 | Kim | |
| 2013/0129965 A1 | 5/2013 | Jeong et al. | |
| 2013/0314620 A1* | 11/2013 | Ebisui | G02F 1/1313 349/1 |
| 2014/0329941 A1* | 11/2014 | Chang | C08K 5/06 524/104 |
| 2015/0062517 A1 | 3/2015 | Lee et al. | |

FOREIGN PATENT DOCUMENTS

| | | |
|---|---|---|
| KR | 1020070035683 A | 4/2007 |
| KR | 10-0936915 B1 | 1/2010 |
| KR | 1020110104416 A | 9/2011 |
| KR | 1020130057153 A | 5/2013 |
| KR | 1020140127641 A | 11/2014 |

(Continued)

*Primary Examiner* — Brook Kebede
(74) *Attorney, Agent, or Firm* — Cantor Colburn LLP (57) ABSTRACT

A liquid crystal display device includes an upper substrate and a lower substrate facing each other, alignment layers, and a liquid crystal layer. An alignment layer is disposed on the upper substrate and an alignment layer is disposed on the lower substrate. The alignment layer includes a vertical alignment layer and a tilting alignment layer. The vertical alignment layer includes a polyimide-based polymer resin having an imidization ratio of about 65% to about 90%. The tilting alignment layer is present on an upper portion of the vertical alignment layer and includes a pattern. The liquid crystal layer is interposed between the upper substrate and the lower substrate.

18 Claims, 8 Drawing Sheets

(56) References Cited

FOREIGN PATENT DOCUMENTS

| KR | 1020150026279 A | 3/2015 |
|----|-----------------|--------|
| KR | 1020150029178 A | 3/2015 |
| KR | 1020150040616 A | 4/2015 |
| KR | 1020150047398 A | 5/2015 |
| KR | 1020150078514 A | 7/2015 |
| KR | 1020150086975 A | 7/2015 |
| KR | 1020150118659 A | 10/2015 |

* cited by examiner

LIQUID CRYSTAL DISPLAY DEVICES AND METHODS OF MANUFACTURING THE SAME

This application claims priority to Korean Patent Application No. 10-2014-0064159, filed on May 28, 2014, and all the benefits accruing therefrom under 35 U.S.C. §119, the content of which in its entirety is herein incorporated by reference.

BACKGROUND

1. Field

Exemplary embodiments relate to liquid crystal display devices and methods of manufacturing the same. More particularly, exemplary embodiments relate to liquid crystal display devices including an alignment layer and methods of manufacturing the same.

2. Description of the Related Art

A liquid crystal display ("LCD") device may be categorized as having a twisted nematic mode, an in-plane switching ("IPS") mode or a vertical aligned ("VA") mode according to properties of a liquid crystal layer. The VA mode may be advantageous from an aspect of obtaining wide viewing angle.

Liquid crystal molecules in the VA mode may be pre-tilted in order to improve a response time and a transmittance of the LCD device. For example, a reactive mesogen ("RM") may be combined with the liquid crystal molecules, or an additional alignment layer may be formed.

SUMMARY

Some exemplary embodiments provide a liquid crystal display device having an improved display quality.

Other exemplary embodiments provide a method of manufacturing a liquid crystal display device having an improved display quality.

According to some exemplary embodiments, there is provided a liquid crystal display device. The liquid crystal display device includes an upper substrate and a lower substrate facing each other, alignment layers, and a liquid crystal layer. An alignment layer is formed on the upper substrate and on the lower substrate. The alignment layer includes a vertical alignment layer and a tilting alignment layer. The vertical alignment layer includes a polyimide-based polymer resin having an imidization ratio of about 65% to about 90%. The tilting alignment layer is formed at an upper portion of the vertical alignment layer and includes a pattern. The liquid crystal layer is interposed between the upper substrate and the lower substrate.

In exemplary embodiments, the imidization ratio is about 75% to about 90%.

In exemplary embodiments, the polyimide-based polymer resin includes a mixture of polyimide and polyamic acid.

In exemplary embodiments, the liquid crystal display device further includes an electrode on the upper substrate and an electrode on the lower substrate. The vertical alignment layer is in contact with the electrode, and the tilting alignment layer is spaced apart from the electrode.

In exemplary embodiments, the liquid crystal layer is in contact with the tilting alignment layer, and includes liquid crystal molecules pre-tilted and vertically aligned.

In exemplary embodiments, the pattern of the tilting alignment layer includes a plurality of islands spaced apart from each other and at least partially buried in the vertical alignment layer.

In exemplary embodiments, spaces between islands in the tilting alignment layer expose portions of a top surface of the vertical alignment layer, and the exposed portions of the top surface of the vertical alignment layer are in contact with the liquid crystal layer.

In exemplary embodiments, the tilting alignment layer includes a reactive mesogen and a polyimide-based polymer resin having an imidization ratio different from that of the vertical alignment layer.

In exemplary embodiments, the imidization ratio of the tilting alignment layer is less than the imidization ratio of the vertical alignment layer.

In exemplary embodiments, the tilting alignment layer further includes a monomer or an oligomer of a polyimide precursor.

According to some exemplary embodiments, there is provided a liquid crystal display device. The liquid crystal display device includes two substrates facing each other, an electrode on each of the substrates, a liquid crystal layer disposed between the two substrates, and an alignment layer disposed between the electrode and the liquid crystal layer. An imidization ratio at a portion of the alignment layer adjacent to the electrode is different from an imidization ratio at a portion of the alignment layer adjacent to the liquid crystal layer.

In exemplary embodiments, the imidization ratio at the portion of the alignment layer adjacent to the electrode is about 65% to about 90%. The imidization ratio at the portion of the alignment layer adjacent to the liquid crystal is less than the imidization ratio at the portion of the alignment layer adjacent to the electrode.

In exemplary embodiments, the imidization ratio at the portion of the alignment layer adjacent to the electrode is about 75% to about 90%.

In exemplary embodiments, the alignment layer includes a polyimide-based polymer resin. The portion of the alignment layer adjacent to the liquid crystal layer further includes a reactive mesogen.

In exemplary embodiments, the portion of the alignment layer adjacent to the liquid crystal layer include a pattern including a plurality of islands.

According to some exemplary embodiments, there is provided a method of manufacturing a liquid crystal display device. In the method, an electrode is formed on each of two substrates. An alignment layer composition including a polyimide-based polymer resin, an imidization ratio of which is about 65% to about 90% is coated on the electrode to form a preliminary alignment layer. The preliminary alignment layer is thermally treated to form an alignment layer. The alignment layer is phase-separated into a vertical alignment layer adjacent to the electrode and a tilting alignment layer spaced apart from the electrode. The tilting alignment layer includes a pattern including a plurality of islands. A liquid crystal layer including liquid crystal molecules is formed between the pair of the substrates. The liquid crystal molecules are aligned.

In exemplary embodiments, an imidization ratio of the alignment layer composition is about 75% to about 90%.

In exemplary embodiments, the liquid crystal layer is formed by dropping a liquid crystal composition on the alignment layer formed on one of the two substrates.

In exemplary embodiments, the liquid crystal molecules are aligned by performing at least one of exposure to ultraviolet light and a generation of an electrical field.

As described above, according to example embodiments of the present inventive concept, an alignment layer included in a liquid crystal display ("LCD") device may include a polyimide-based polymer resin having a predetermined range of an imidization ratio. Accordingly, an interaction between liquid crystal molecules and components of the alignment layer may be suppressed at a top surface of the alignment layer. Therefore, a deterioration of a display quality due to a mura, a spot or an after-image occurring when the components of the alignment layer is diffused or transferred may be avoided.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

The invention will be described more fully hereinafter with reference to the accompanying drawings, in which various embodiments are shown. This invention may, however, be embodied in many different forms and should not be construed as limited to the example embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity. Like numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are used to distinguish one element, component, region, layer and/or section from another. Thus, a "first element," "component," "region," "layer" and/or "section" discussed below could be termed a second element, component, region, layer and/or section without departing from the teachings herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, relative terms, such as lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
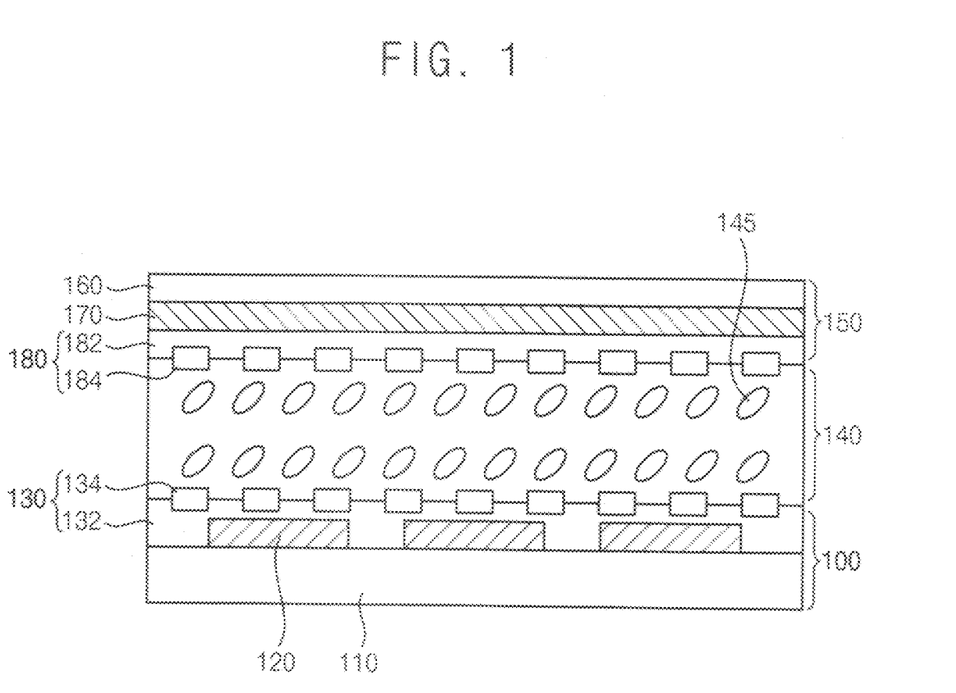
FIG. 1 is a cross-sectional view illustrating an exemplary embodiment of a liquid crystal display device.

FIG. 1 is a cross-sectional view illustrating an exemplary embodiment of a liquid crystal display ("LCD") device.

Referring to FIG. 1, the LCD device may include a lower substrate structure 100, an upper substrate structure 150 and a liquid crystal layer 140. The liquid crystal layer 140 may be interposed between the lower substrate structure 100 and the upper substrate structure 150.

The lower substrate structure 100 may include a lower substrate 110, a lower electrode 120 and a lower alignment layer 130.

The lower substrate 110 may serve as a base substrate of the LCD device. The lower substrate 100 may include a transparent material. In exemplary embodiments, a glass substrate or a transparent plastic substrate may be used as the lower substrate 110. The transparent plastic substrate may include polyethylene terephthalate ("PET"), polyethylene naphthalate ("PEN"), polyacrylate, or the like.

In exemplary embodiments, the lower substrate 110 may include a thin film transistor ("TFT") array formed thereon. Further, a wiring array (not shown) including a data line, a gate line, etc., may be formed on the lower substrate 110 to be electrically connected to the TFT array.

In one exemplary embodiment, a color filter (not shown) and/or a black matrix ("BM")(not shown) may be further formed on the lower substrate 110.

The lower electrode 120 may be disposed on the lower substrate 110. In exemplary embodiments, the lower electrode 120 may serve as a pixel electrode of the LCD device. In this case, the lower electrode 120 may be electrically connected to a TFT formed on the lower substrate 110, and may be patterned per each pixel. Accordingly, as illustrated in FIG. 1, a plurality of the lower electrodes 120 may be arranged on a plurality of the pixels.

The lower electrode 120 may include a transparent conductive material such as indium zinc oxide ("IZO"), indium tin oxide ("ITO"), zinc tin oxide ("ZTO"), zinc oxide, tin oxide, or the like. Alternatively, the lower electrode 120 may include a metal such as chromium (Cr), aluminum (Al), tantalum (Ta), molybdenum (Mo), titanium (Ti), tungsten (W), copper (Cu), neodymium (Nd) or the like, or an alloy thereof.

The lower alignment layer 130 may be formed on the lower substrate 110 to cover the lower electrode 120.

The lower alignment layer 130 may include a polyimide-based polymer resin. In an exemplary embodiment, the lower alignment layer 130 may include a mixture of polyimide and polyamic acid ("PAA").

In exemplary embodiments, an imidization ratio of the lower alignment layer 130 at a portion adjacent to the lower electrode 120 may be different from that at a portion adjacent to the liquid crystal layer 140. In exemplary embodiments, the imidization ratio at the portion adjacent to the lower electrode 120 may be from about 65% to about 90%, specifically, from about 75% to about 90%. The imidization ratio at the portion adjacent to the liquid crystal layer 140 may be lower than that at the portion adjacent to the lower electrode 120. In this case, a mobility of components included in the lower alignment layer 130 at the portion adjacent to the liquid crystal layer 140 may be suppressed or interrupted by the portion adjacent to the lower electrode 120.

In one exemplary embodiment, as illustrated in FIG. 1, the lower alignment layer 130 may include a lower vertical alignment layer 132 and a lower tilting alignment layer 134. The lower vertical alignment layer 132 may be formed at the portion adjacent to the lower electrode 120. The lower tilting alignment layer 134 may be formed at the portion adjacent to the liquid crystal layer 140.

In one exemplary embodiment, the lower tilting alignment layer 134 may be formed in a pattern such as a plurality of islands spaced apart from each other on the lower vertical alignment layer 132. In an exemplary embodiment, the lower tilting alignment layer 134 may include a plurality of islands spaced apart from each other on the lower vertical alignment layer 132. In this case, each pattern of the lower tilting alignment layer 134 may be at least partially buried or embedded in the lower vertical alignment layer 132. A top surface of the lower tilting alignment layer 134 may expose a top surface of the lower vertical alignment layer 132. In one exemplary embodiment, the each pattern of the lower tilting alignment layer 134 may protrude from the top surface of the lower vertical alignment layer 132.

The lower vertical alignment layer 132 may include the polyimide-based polymer resin. In an exemplary embodiment, the lower vertical alignment layer 132 may include the mixture of polyimide and polyamic acid ("PAA"). In one exemplary embodiments, an imidization ratio of the lower vertical alignment layer 132 may range from about 65% to about 90%, in another exemplary embodiment, about 75% to about 90%.

The lower tilting alignment layer 134 may include a reactive mesogen ("RM") and the polyimide-based polymer resin. In one exemplary embodiment, the lower tilting alignment layer 134 may further include a monomer or an oligomer from a polyimide precursor. An imidization ratio of the lower tilting alignment layer 134 may be less than that of the lower vertical alignment layer 132.

The reactive mesogen may include a material such as acrylate, methacrylate, epoxide, oxetane, vinyl ether, styrene, thiolene, or a combination thereof. These materials may be used alone or in a combination thereof. In one exemplary embodiment, an acrylate or methacrylate may be used as the reactive mesogen.

A definition and a measuring method of the imidization ratio are explained with reference to the following Reaction Equation 1.

Reaction Equation 1:

+

(1)

Referring to Reaction Equation 1 above, a dianhydride such as tetra carboxylic acid dianhydride represented by Chemical Formula (1) and a diamine, e.g., represented by Chemical Formula (2) may be reacted to form polyamic acid represented by Chemical Formula (3). The dianhydride and diamine may serve as the polyimide precursors.

Polyamic acid may be transformed into polyimide represented by Chemical Formula (4) by a thermal treatment and/or a suitable catalyst. For example, a nitrogen atom of an amide group in polyamic acid of Chemical Formula (3) may attack a carbon atom of a carboxylic group such that an imidization may progress. In this case, an amide hydrogen indicated by a circle may be removed by dehydration. The number of polymer units in which the amide hydrogen is removed among the total number of the polymer units may be measured to determine the imidization ratio. A presence or an absence of the amide hydrogen may be measured by observing a presence or an absence of an amide hydrogen peak in an proton nuclear magnetic resonance ("H-NMR") spectrum.

The upper substrate structure 150 may be disposed over the lower substrate structure 100 such that upper and lower substrate structures 150 and 100 may face each other. The upper substrate structure 150 may include an upper substrate 160, and an upper electrode 170 and an upper alignment layer 180 sequentially stacked on the upper substrate 160.

In exemplary embodiments, the upper substrate 160 may serve as a color filter substrate of the LCD device. In this case, the upper substrate 160 may include color filters corresponding to pixels generating a red color (R), a green color (G) and a blue color (B). A black matrix (not shown) may be further formed on the upper substrate 160.

The upper electrode 170 may be disposed on the upper substrate 160. The upper electrode 170 may include a transparent conductive material such as ITO, IZO, ZTO, zinc oxide, tin oxide, or the like. In exemplary embodiments, the upper electrode 170 may serve as a common electrode of the LCD device.

The upper alignment layer 180 may be formed on the upper substrate 160 to cover the upper electrode 170. In exemplary embodiments, the upper alignment layer 180 may have a composition and/or a construction substantially the same as or similar to those of the lower alignment layer 130.

In exemplary embodiments, an imidization ratio of the upper alignment layer 180 at a portion adjacent to the upper electrode 170 may be different from that at a portion adjacent to the liquid crystal layer 140. In one exemplary embodiment, the imidization ratio at the portion adjacent to the upper electrode 170 may range from about 65% to about 90%, in another exemplary embodiment, about 75% to about 90%. The imidization ratio at the portion adjacent to the liquid crystal layer 140 may be less than that at the portion adjacent to the upper electrode 170. In this case, a mobility of components included in the upper alignment layer 180 at the portion adjacent to the liquid crystal layer 140 may be suppressed or interrupted by the portion adjacent to the upper electrode 170.

In one exemplary embodiment, the upper alignment layer 180 may include an upper vertical alignment layer 182 and an upper tilting alignment layer 184. The upper vertical alignment layer 182 may be formed at the portion adjacent to the upper electrode 170. The upper tilting alignment layer 184 may be formed at the portion adjacent to the liquid crystal layer 140.

In one exemplary embodiment, the upper tilting alignment layer 184 may be formed as pattern such as a plurality of islands spaced apart from each other at the portion adjacent to the liquid crystal layer 140. Each pattern of the upper tilting alignment layer 184 may be at least partially buried or embedded in the upper vertical alignment layer 182, and may be exposed from a surface of the upper vertical alignment layer 182.

The upper vertical alignment layer 182 may include a polyimide-based polymer resin, an imidization ratio of which may range from about 65% to about 90%, specifically, about 75% to about 90%. The upper tilting alignment layer 184 may include a reactive mesogen ("RM") and the polyimide-based polymer resin. In one exemplary embodiment, the upper tilting alignment layer 184 may further include a monomer or an oligomer from the polyimide precursor. An imidization ratio of the upper tilting alignment layer 184 may be less than that of the upper vertical alignment layer 182.

The liquid crystal layer 140 may be interposed between the upper substrate structure 150 and the lower substrate structure 100. In an exemplary embodiment, the liquid crystal layer may be in contact with exposed surfaces of the upper alignment layer 180 and the lower alignment layer 130.

In one exemplary embodiment, the liquid crystal layer 140 may be in contact with the upper tilting alignment layer 184 and the lower tilting alignment layer 134. Further, the liquid crystal layer 140 may be in contact with surfaces of the upper vertical alignment layer 182 and the lower vertical alignment layer 132 exposed between the patterns of the upper tilting alignment layer 184 and the lower tilting alignment layer 134.

The liquid crystal layer 140 may include liquid crystal molecules 145 therein.

The liquid crystal molecules 145 may be pre-tilted by an exposure to an electrical field and/or an ultraviolet light. In exemplary embodiments, the liquid crystal molecules 145 may be vertically aligned by portions of the vertical alignment layers 132 and 182 which are exposed between the spaces defined in the tilting alignment layers 134 and 184 having an island pattern. Further, the liquid crystal molecules 145 may be pre-tilted by the tilting alignment layers 134 and 184 exposing portions of the vertical alignment layers 132 and 182. Thus, a viewing angle, a response speed, a transmittance, etc., of the LCD device may be improved.

According to exemplary embodiments described above, the vertical alignment layers 132 and 182 may include the polyimide-based polymer resin having the predetermined range of the imidization ratio. In the range of the imidization ratio, an adhesion between the vertical alignment layers 132 and 182 and the tilting alignment layers 134 and 184 may be improved so that diffusion or swelling of the tilting alignment layers 134 and 184 may be prevented. Thus, components included in the tilting alignment layers 134 and 184, e.g., the monomer or the oligomer of the polyimide precursor, may have reduced mobility. Therefore, a texture, a mura and a spot of a display screen generated when the components are intervened between the liquid crystal molecules 145 may be prevented.

FIGS. 2 to 7 are cross-sectional views illustrating exemplary embodiments of a method of manufacturing a liquid crystal display device.

Figure 2:
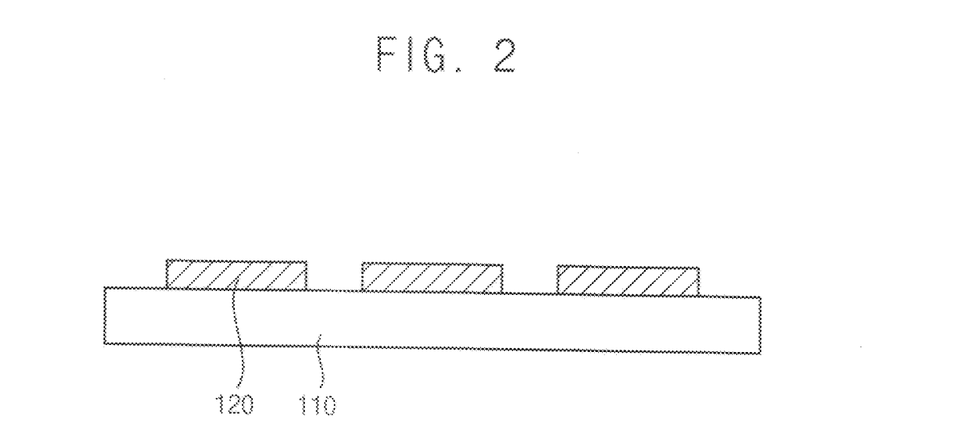
FIGS. 2 to 7 are cross-sectional views illustrating an exemplary method of manufacturing a liquid crystal display.

Referring to FIG. 2, a lower electrode 120 may be formed on a lower substrate 110.

A glass substrate or a transparent plastic substrate may be used as the lower substrate 110. The transparent plastic substrate may be formed using, e.g., PET, PEN, polyacrylate, or the like.

In exemplary embodiments, a TFT array may be formed on the lower substrate 110. In an exemplary device, a TFT including a gate insulation layer, a gate electrode, a semiconductor layer, a source electrode and a drain electrode may be formed on the lower substrate 110. A gate line electrically connected to the gate electrode and a data line electrically connected to the source electrode may be formed. A passivation layer covering the TFT array may be further formed on the lower substrate 110.

In one exemplary embodiment, a color filter and/or a black matrix may be further formed on the lower substrate 110.

The lower electrode 120 may be formed using a transparent conductive material such as IZO, ITO, ZTO, zinc oxide, tin oxide, or the like. Alternatively, the lower electrode 120 may be formed using a metal such as Cr, Al, Ta, Mo, Ti, W, Cu, Nd or the like, or an alloy thereof. The lower electrode 120 may be formed by a sputtering process, a chemical vapor deposition ("CVD") process, an atomic layer deposition ("ALD") process, a vacuum deposition process or a printing process.

The lower electrode 120 may be electrically connected to the drain electrode of the TFT. In an exemplary device, the passivation layer may be partially etched to form a contact hole through which the drain electrode is exposed. The lower electrode 120 may make contact with the drain electrode via the contact hole.

The lower electrode 120 may be patterned per each pixel. In this case, the TFT and the lower electrode 120 may be formed per each pixel.

Figure 3:
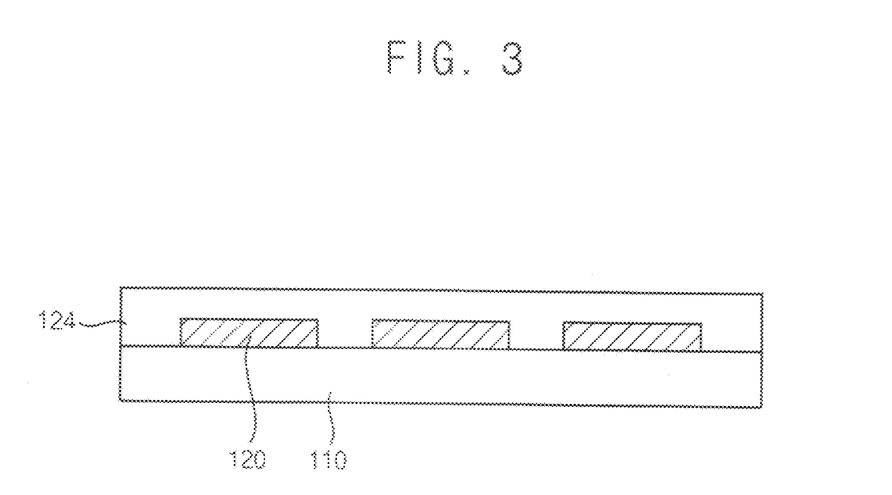

Referring to FIG. 3, a preliminary lower alignment layer 124 covering the lower electrode 120 may be formed on the lower substrate 110.

In exemplary embodiments, an alignment layer composition may be coated on the lower substrate 110 and the lower electrode 120 by, for example, an inkjet printing process, a roll printing process or a spin coating process.

The alignment layer composition may include a polyimide-based polymer resin, a reactive mesogen and a solvent.

In exemplary embodiments, the polyimide-based polymer resin may include a mixture of polyimide and polyamic acid. An imidization ratio of the polyimide-based polymer resin may range from about 65% to about 90%. In one exemplary embodiment, the imidization ratio of the polyimide-based polymer resin may range from about 75% to about 90%.

As described above, the reactive mesogen may include acrylate, methacrylate, epoxide, oxetane, vinyl ether, styrene, thioleneor a combination thereof.

The solvent may include an organic solvent having a good solubility to a polymer material, for example, N-methyl-pyrrolidone ("NMP"), butyrolactone or butyl cellosolve. These may be used alone or in a combination thereof. The alignment layer composition may further include an additive such as a photosensitive agent or a thermal curing agent.

In one exemplary embodiment, after coating the alignment layer composition, the solvent may be evaporated by a preliminary thermal treatment to form the preliminary lower alignment layer 124. In an exemplary embodiment, the preliminary thermal treatment may be performed at a temperature from about 80 degrees Celsius (° C.) to about 120° C. Alternatively, the coated alignment layer composition may be left at room temperature ("RT") for a predetermined time to form the preliminary lower alignment layer 124.

After coating the alignment layer composition on the lower electrode 120, components in the composition having a relatively high polarity and a hydrophilicity may be migrated toward the lower electrode 120 due to an affinity thereto. Components in the composition having a relatively low polarity and a hydrophobicity may migrate towards the outer atmosphere, and thus are distributed toward a top surface of the preliminary lower alignment layer 124 or against the lower electrode 120. Accordingly, a phase separation may occur in the preliminary lower alignment layer 124.

In an exemplary embodiment, the components having the relatively low polarity and the hydrophobicity may include the reactive mesogen, and a monomer or an oligomer from a polyimide precursor. The monomer or the oligomer may include the diamine and/or dianhydride represented in Reaction Equation 1 above. The diamine and/or dianhydride may have a symmetrical molecular structure, and thus may have the low polarity and hydrophobicity.

If the imidization ratio of the polyimide-based polymer resin is less than about 65%, the mobility of the monomer or the oligomer distributed at an upper portion of the preliminary lower alignment layer 124 may be increased so that the monomer or the oligomer may be disposed between liquid crystal molecules 145 (see FIG. 6) to cause a texture, a mura and/or a spot on a display screen. If the imidization ratio of the polyimide-based polymer resin is greater than about 90%, the solubility of the solvent may be significantly decreased, and thus the alignment layer composition may not be uniformly coated.

Figure 4:
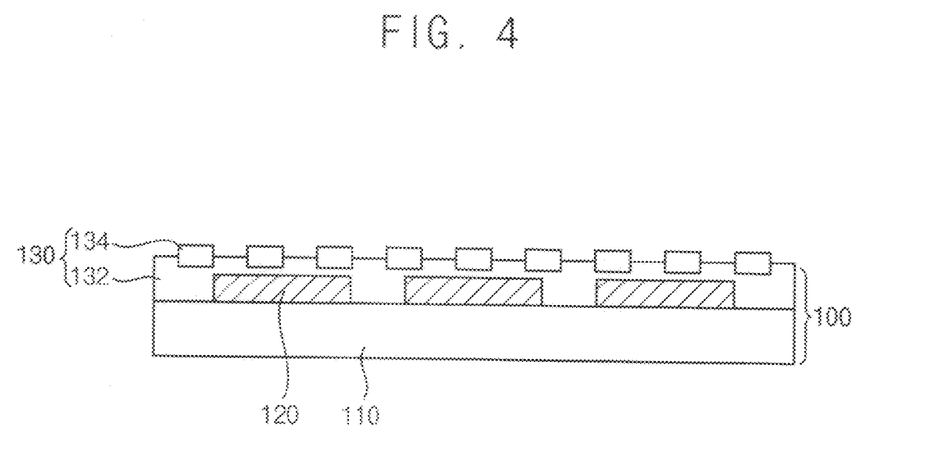

Referring to FIGS. 3 and 4, the preliminary lower alignment layer 124 may be cured and thereby transformed into a lower alignment layer 130.

In exemplary embodiments, a thermal treatment may be performed on the preliminary lower alignment layer 124 to form the lower alignment layer 130. In an exemplary embodiment, the thermal treatment may be performed at a temperature ranging from about 200° C. to about 300° C.

In exemplary embodiments, the lower alignment layer 130 may be divided into a lower vertical alignment layer 132 and a lower tilting alignment layer 134 due to the phase separation of the preliminary lower alignment layer 124.

As a result of the thermal treatment, the components having the relatively high polarity and the hydrophilicity around the lower electrode 120 are cured to form the lower vertical alignment layer 132. In exemplary embodiments, the lower vertical alignment layer 132 may include the polyimide-based polymer resin or the mixture of polyimide and polyamic acid, and may have an imidization ratio ranging from about 65% to about 90%, in one exemplary embodiment, from about 75% to about 90%.

The components having the relatively low polarity and the hydrophobicity and migrated against the lower electrode 120 may be cured to form the lower tilting alignment layer 134. In exemplary embodiments, the lower tilting alignment layer 134 may include the reactive mesogen, and the monomer or the oligomer from the polyimide precursor. In one exemplary embodiment, at least a portion of the monomer or the oligomer included in the lower tilting alignment layer 134 may be cross-linked to form a polyimide-based polymer. The lower tilting alignment layer 134 may have an imidization ratio less than that of the lower vertical alignment layer 132.

Accordingly, the lower alignment layer 130 may have different imidization ratios at an upper portion spaced apart from the lower electrode 120 and a lower portion adjacent to the lower electrode 120. In an exemplary lower alignment layer, the imidization ratio of the lower portion may range from about 65% to about 90%, and in one exemplary embodiment, from about 75% to about 90%. The imidization ratio of the upper portion may be less than that of the lower portion.

In one exemplary embodiment, as illustrated in FIG. 4, the lower tilting alignment layer 134 may be formed in a pattern, such as a plurality of islands, at an upper portion of the lower vertical alignment layer 132. The lower vertical alignment layer 132 may have the imidization ratio mentioned above so that the mobility of the reactive mesogen, the monomer and the oligomer may be limited. Thus, the lower tilting alignment layer 134 may not be formed as a uniformly coated, continuous layer, but rather formed as the plurality of islands.

Further, adhesion between the lower vertical alignment layer 132 and the lower tilting alignment layer 134 may be improved in the above range of the imidization ratio. Thus, components in the lower tilting alignment layer 134 may be prevented from being diffused or transferred.

The lower tilting alignment layer 134 may be at least partially buried or embedded in the lower vertical alignment layer 132. A top surface of the lower tilting alignment layer 134 may be exposed from a top surface of the lower vertical alignment layer 132. The top surface of the lower vertical alignment layer 132 may be exposed in the spaces between the neighboring islands of the lower tilting alignment layer 134.

After the formation of the lower alignment layer 130, a lower substrate structure 100 including the lower electrode 120 and the lower alignment layer 130 formed on the lower substrate 110 may be obtained.

Figure 5:
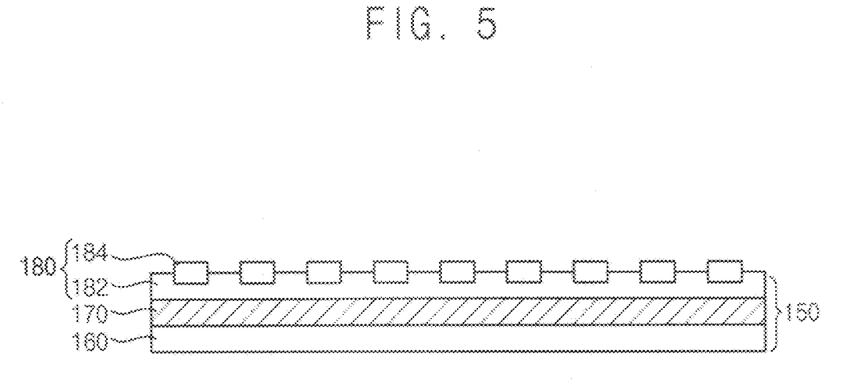

Referring to FIG. 5, processes substantially the same as, or similar to, those illustrated with reference to FIGS. 2 to 4 may also be performed to form an upper substrate structure 150. In exemplary embodiment, an upper electrode 170 and an upper alignment layer 180 may be formed on an upper substrate 160.

The upper substrate 160 may serve as a color filter substrate of the LCD device. In this case, the upper substrate may include a color filter for each of RGB pixels. A black matrix may be further formed on the upper substrate 160.

The upper electrode may be formed using a transparent conductive material such as ITO, IZO, ZTO, zinc oxide or tin oxide by a CVD process, an ALD process, a vacuum process, a printing process, etc., but is not limited thereto. In one exemplary embodiment, the upper electrode 170 may serve as a common electrode of the LCD device. In this case, the upper electrode 170 may cover a substantially whole surface of the upper substrate 160.

The upper alignment layer 180 may be formed using processes and materials substantially the same as or similar to those of the lower alignment layer 130.

In exemplary embodiments, the alignment layer composition mentioned above may be coated on the upper electrode 170 to form a preliminary upper alignment layer. The preliminary upper alignment layer may be thermally treated to form the upper alignment layer 180. The upper alignment layer 180 may then be divided into an upper vertical alignment layer 182 and an upper tilting layer 184. The upper tilting alignment layer 184 may be formed to have a pattern such as a plurality of islands at an upper portion of the upper vertical alignment layer 182.

The upper vertical alignment layer 182 may include a polyimide-based polymer resin having animidization ratio of which ranges from about 65% to about 90%, in one exemplary embodiment, from about 75% to about 90%. The upper tilting alignment layer 184 may include a reactive mesogen, and may have an imidization ratio less than that of the upper vertical alignment layer 182.

Figure 6:
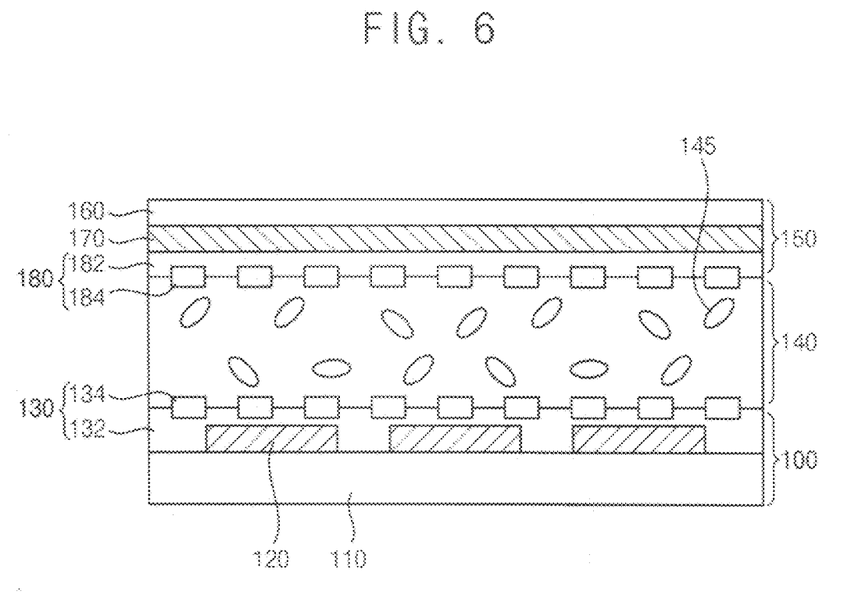

Referring to FIG. 6, a liquid crystal layer 140 may be formed between the lower substrate structure 100 and the upper substrate structure 150.

In exemplary embodiments, a liquid crystal composition including the liquid crystal molecules 145 may be dropped on the lower alignment layer 130 or the upper alignment layer 180 to form a plurality of liquid crystal droplets. For example, the liquid crystal composition may be dropped on the lower alignment layer 130 of the lower substrate structure 100.

In exemplary embodiments, the mobility of components of the tilting alignment layers 134 and 184 may be limited due to a strong adhesion between the tilting alignment layers 134 and 184, and the vertical alignment layers 132 and 182. Thus, the diffusion or a concentration of the monomer or the oligomer between the liquid crystal molecules or between the liquid crystal droplets may be suppressed.

When the liquid crystal droplets are leveled uniformly to form a liquid crystal composition layer, the lower substrate structure 100 and the upper substrate structure 150 may be attached to each other such that the lower alignment layer 130 and the upper alignment layer 180 may face each other. Accordingly, the liquid crystal layer 140 may be formed between the lower substrate structure 100 and the upper substrate structure 150. The liquid crystal molecules 145 included in the liquid crystal layer 140 may be randomly aligned in an initial state.

Figure 7:
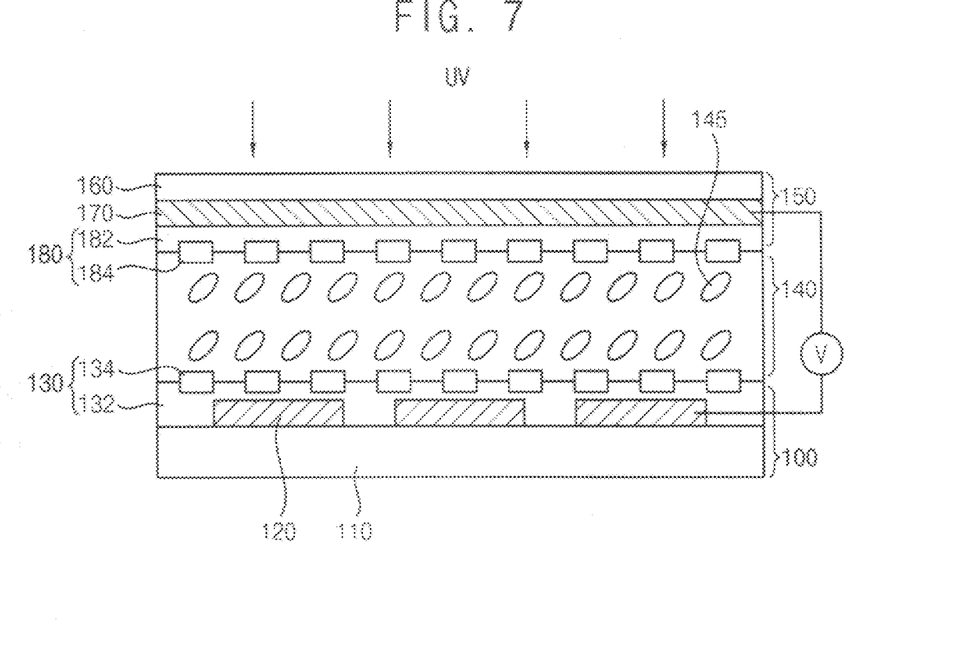

Referring to FIG. 7, the liquid crystal molecules 145 in the liquid crystal layer 140 may be aligned in a predetermined configuration. In exemplary embodiments, the liquid crystal molecules 145 may be vertically aligned with a pre-tilting angle.

In exemplary embodiments, a predetermined voltage (V) may be applied through the lower electrode 120 and the upper electrode 170 to generate an electrical field in the liquid crystal layer 140. Accordingly, the liquid crystal molecules 145 may be vertically aligned by an interaction with the vertical alignment layers 132 and 182, and may be pre-tilted by the tilting alignment layers 134 and 184.

In one exemplary embodiment, an ultraviolet ("UV") exposure may be further performed together with the generation of the electrical field. The UV exposure and the generation of the electrical field may therefore be performed simultaneously.

In one exemplary embodiment, the generation of the electrical field may be omitted, and the liquid crystal molecules may be aligned only by the UV exposure. The alignments layers 130 and 180 may be further cured by the UV exposure.

Figure 8:
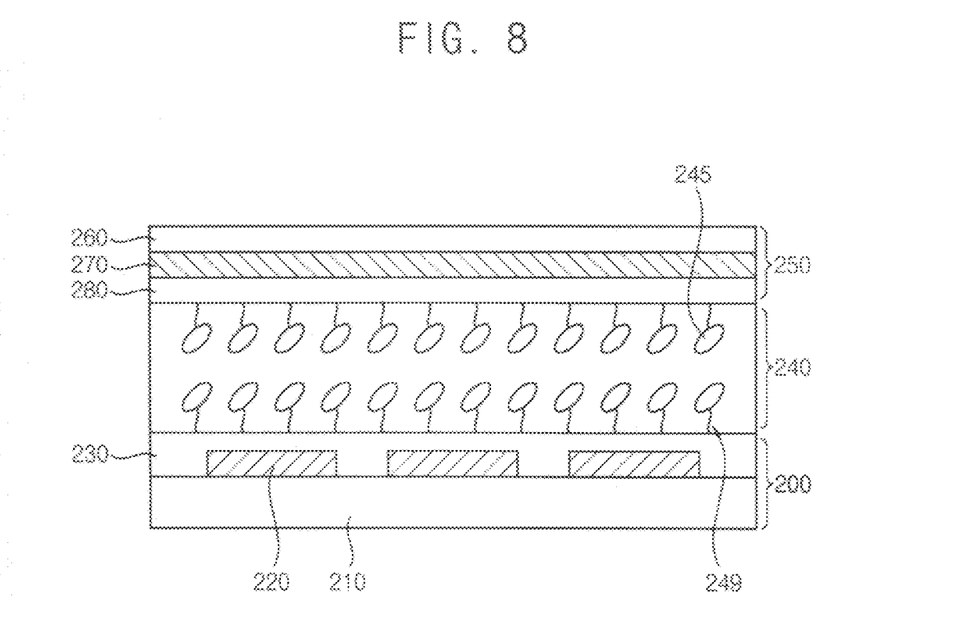
FIG. 8 is a cross-sectional view illustrating a comparative example of a liquid crystal display device.

FIG. 8 is a cross-sectional view illustrating a comparative example of a liquid crystal display device. For example, FIG. 8 illustrates a super vertical aligned ("SVA") mode LCD device.

Referring to FIG. 8, the LCD device of the comparative example may include a lower substrate structure 200, an upper substrate structure 250 and a liquid crystal layer 240.

The lower substrate structure 200 may include a lower electrode 220 formed on a lower substrate 210, and a lower alignment layer 230 covering the lower electrode 220. The upper substrate structure 250 may include an upper electrode 270 formed on an upper substrate 260, and an upper alignment layer 280 covering the upper electrode 270.

The lower substrate 210, the lower electrode 220, the upper substrate 260 and the upper electrode 270 may have structures which are substantially the same as or similar to those of the LCD device illustrated in FIG. 1.

The lower and upper alignment layers 230 and 280 may include polyimide.

The liquid crystal layer 240 may include liquid crystal molecules 245, and may be interposed between the lower and upper substrate structures 200 and 250. In the comparative example, a reactive mesogen 249 may be provided in the liquid crystal layer 240 and is combined with the liquid crystal molecule 245.

In the comparative example, the liquid crystal molecules 245 may be vertically aligned with respect to the lower substrate 210 or the upper substrate 260 by the alignment layers 230 and 280, and may be pre-tilted by the reactive mesogen 249. For example, the reactive mesogen 249 may be included in the alignment layers 230 and 280, and then a cross-linking or a polymerization of the reactive mesogens 249 may be conducted so that the liquid crystal molecules 245 may be pre-tilted.

Figure 9:
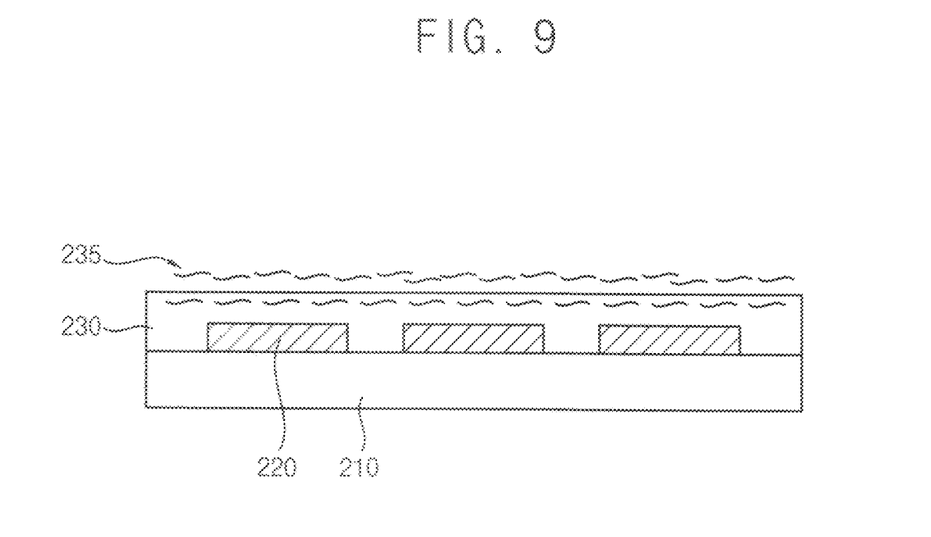
FIGS. 9 to 11 are cross-sectional views illustrating a comparative method of manufacturing a liquid crystal display device.
Figure 10:
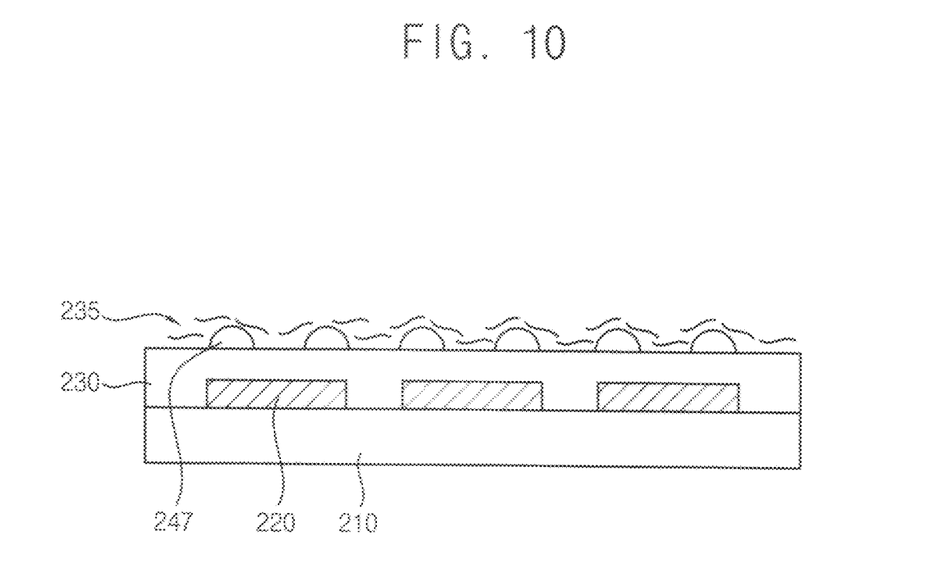
Figure 11:
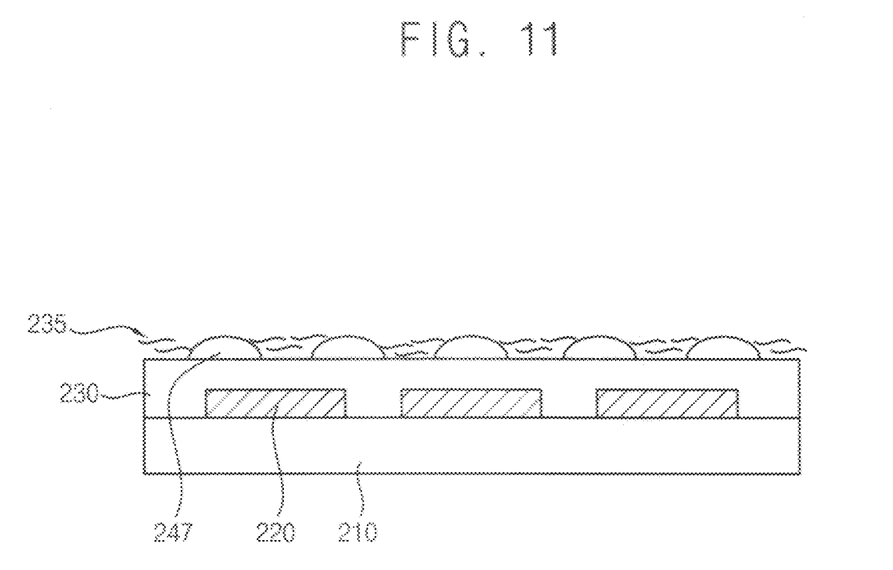

FIGS. 9 to 11 are cross-sectional views illustrating an exemplary embodiment of a method of manufacturing a comparative example of a liquid crystal display device.

Referring to FIG. 9, a process substantially the same as or similar to that illustrated with reference to FIG. 2 may be performed to form a lower electrode 220 on a lower substrate 210. A lower alignment layer 230 including polyimide may be formed on the lower substrate 210 and the lower electrode 220. During the formation of the lower alignment layer 230, non-polymerized oligomers 235 may be distributed at an upper portion or on a top surface of the lower alignment layer 230.

Referring to FIG. 10, liquid crystal droplets 247 may be formed on the lower alignment layer 230 in order to form a liquid crystal layer. The non-polymerized oligomers 235 migrate between the neighboring liquid crystal droplets 247 by a shear force of the liquid crystal droplets 247.

Referring to FIG. 11, the liquid crystal droplets 247 may be leveled or swelled, and the non-polymerized oligomers 235 may be concentrated between the neighboring liquid crystal droplets 247 by shear force. Accordingly, the liquid crystal droplets 247 may not be completely leveled, and thus a uniform liquid crystal layer may not be obtained. Additionally, a texture, a mura and a spot may occur on a display screen due to the concentrated oligomers 235 thereby resulting in a deterioration of a display quality.

However, according to exemplary embodiments, an alignment layer may be divided into a vertical alignment layer and a tilting alignment layer, and may include a polyimide-based polymer resin having a predetermined range of an imidization ratio. In the range of the imidization ratio, adhesion between the vertical alignment layer and the tilting alignment layer may be enhanced so that the mobility of non-polymerized oligomers included in the tilting alignment layer may be limited. Therefore, the localized concentration of the oligomers between liquid crystal droplets may be prevented. Thus, a generation of the texture and the spot on a display screen may be reduced.

EXAMPLES

Hereinafter, the display quality of exemplary compositions of an alignment layer is described in more detail with reference to the Experimental Examples.

Experimental Example 1

An alignment layer composition was prepared using a polyimide resin, the imidization ratio of which was measured as 50%. The alignment layer composition was coated on an upper electrode and a lower electrode including ITO to form both an upper alignment layer and a lower alignment layer. A mixture of NMP and butyl cellosolve was used as the solvent for the alignment layer composition.

A liquid crystal layer was formed between the upper and lower alignment layers. A voltage of 20 volts (V) was applied through the upper and lower electrodes, and then irradiation with UV light was performed to form the LCD device of Experimental Example 1.

The mura level of a display screen was measured when the LCD device of Experimental Example 1 was operated.

Experimental Example 2

An LCD device was manufactured in substantially the same manner as described in Experimental Example 1 except that the imidization ratio of the polyimide resin was increased to 65%. The mura level of the LCD device was then measured.

Experimental Example 3

An LCD device was manufactured in substantially the same manner as described in Experimental Example 1 except that the imidization ratio of the polyimide resin was increased to 75%. The mura level of the LCD was then measured.

Figure 12:
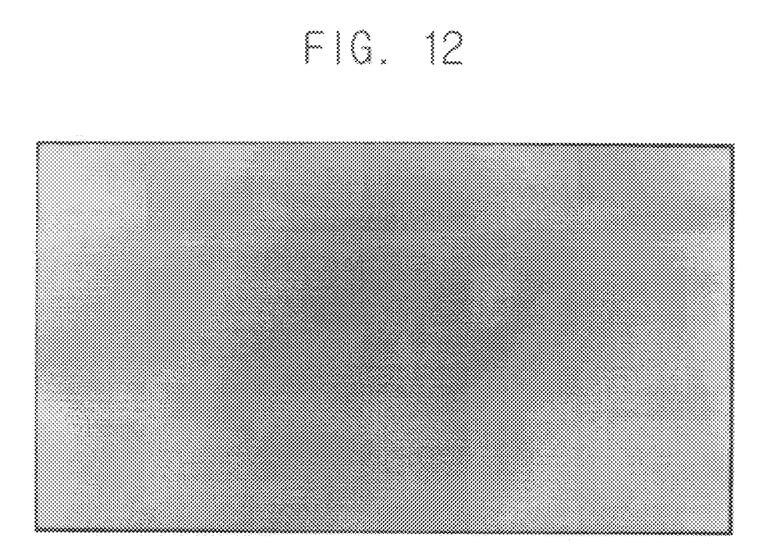
FIGS. 12, 13 and 14 are images of display screens from the liquid display devices of Experimental Examples 1, 2 and 3, respectively.
Figure 13:
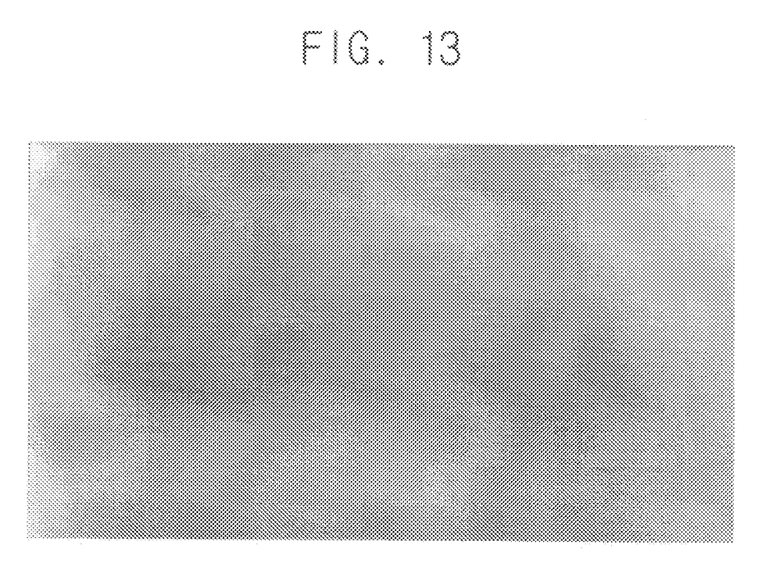
Figure 14:
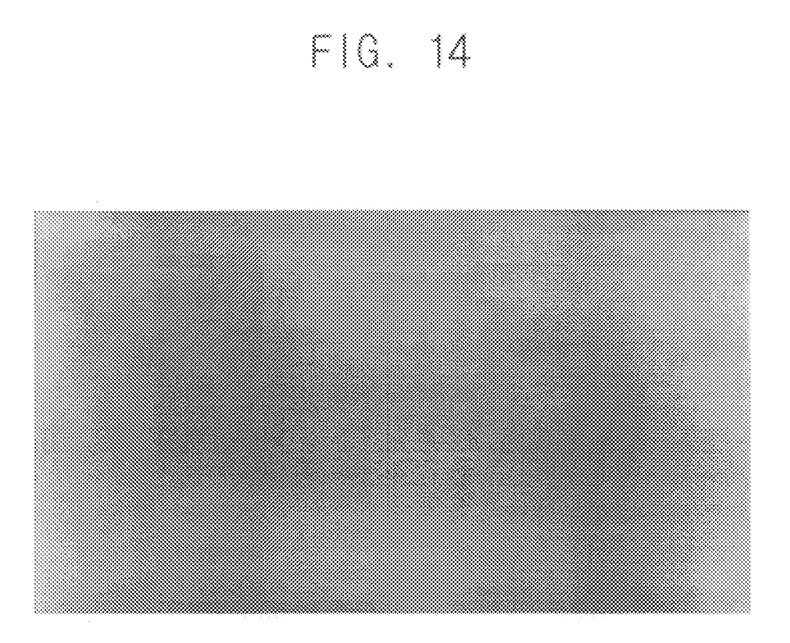

FIGS. 12, 13 and 14 are images of the display screens for the LCD devices of Experimental Examples 1, 2 and 3, respectively.

FIG. 12 shows the display screen for the LCD of Experimental Example 1, having an imidization ratio of 50%. Referring to FIG. 12, textures and stripes generated by a concentration of oligomers included in the alignment layers were visibly observed. The mura level of Experimental Example 1 was set as a number of 5.

Referring to FIGS. 13 and 14, it was demonstrated that the mura level was reduced as the imidization ratio became increased. In particular, for the imidization ratio of 65% (Experimental Example 2), the mura level was measured at about 2, a level that was about 60% less than the mural level of Experimental Example 1. For the imidization level of 75% (Experimental Example 3), the mura level was measured as substantially zero.

According to exemplary embodiments of the invention described herein, the LCD device and manufacturing methods thereof as described above may be implemented to effectively produce a display device of a VA mode such as a surface stabilized vertical aligned ("SS-VA") mode. Thus, a display device which is free of a texture, a spot and/or a mura may be realized.

The foregoing is illustrative of exemplary embodiments and is not to be construed as limiting thereof. Although a few exemplary embodiments have been described, those skilled in the art will readily appreciate that many modifications are possible without materially departing from the novel teachings and advantages of the present invention. Accordingly, all such modifications are intended to be included within the scope of the invention as defined in the claims. Therefore, it is to be understood that the foregoing is illustrative of various example embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A liquid crystal display device, comprising:
an upper substrate and a lower substrate facing each other;
an alignment layer on the upper substrate and an alignment layer on the lower substrate, wherein each alignment layer is phase-separated into a vertical alignment layer and a tilting alignment layer;
wherein the vertical alignment layer comprises a polyimide-based polymer resin, wherein the polyimide-based polymer resin has an imidization ratio of about 65% to about 90%; and
wherein the tilting alignment layer is on an upper portion of the vertical alignment layer, wherein the tilting alignment layer comprises a pattern; and
a liquid crystal layer interposed between the upper substrate and the lower substrate.

2. The liquid crystal display device of claim 1, wherein the imidization ratio of the polyimide-based polymer resin is about 75% to about 90% and a mura level of an image of a display screen of the liquid crystal display is substantially zero.

3. The liquid crystal display device of claim 1, wherein the polyimide-based polymer resin comprises a mixture of polyimide and polyamic acid.

4. The liquid crystal display device of claim 1, further comprising an electrode on the upper substrate and an electrode on the lower substrate,
wherein the vertical alignment layer of the alignment layer on the upper substrate is in contact with the electrode on the upper substrate, and the tilting alignment layer of the alignment layer on the upper substrate is spaced apart from the electrode on the upper substrate; and
wherein the vertical alignment layer of the alignment layer on the lower substrate is in contact with the electrode on the lower substrate, and the tilting alignment layer of the alignment layer on the lower substrate is spaced apart from the electrode on the lower substrate.

5. The liquid crystal display device of claim 4, wherein the liquid crystal layer is in contact with each tilting alignment layer, and wherein the liquid crystal layer comprises liquid crystal molecules which are pre-tilted and vertically aligned.

6. The liquid crystal display device of claim 1, wherein the pattern of the tilting alignment layer comprises a plurality of islands spaced apart from each other and at least partially buried in the vertical alignment layer.

7. The liquid crystal display device of claim 6,
wherein spaces between islands in the tilting alignment layer expose portions of a top surface of the vertical alignment layer, and
wherein the exposed portions of the top surface of the vertical alignment layer is in contact with the liquid crystal layer.

8. The liquid crystal display device of claim 1, wherein the tilting alignment layer comprises a reactive mesogen and a polyimide-based polymer resin having an imidization ratio which is different from the imidization ratio of the vertical alignment layer.

9. The liquid crystal display device of claim 8, wherein the imidization ratio of the tilting alignment layer is less than the imidization ratio of the vertical alignment layer.

10. The liquid crystal display device of claim 8, wherein the tilting alignment layer further comprises a monomer or an oligomer of a polyimide precursor.

11. A liquid crystal display device, comprising:
two substrates facing each other;
an electrode on each of the two substrates;
a liquid crystal layer between the two substrates; and
an alignment layer between the electrode and the liquid crystal layer, wherein the alignment layer comprises a polyimide-based polymer having an imidization ratio, wherein the imidization ratio at the portion of the alignment layer adjacent to the electrode is about 65% to about 90%, and the imidization ratio of the portion of the alignment layer adjacent to the liquid crystal layer is less than the imidization ratio at the portion of the alignment layer adjacent to the electrode.

12. The liquid crystal display device of claim 11, wherein the imidization ratio at the portion of the alignment layer adjacent to the electrode is about 75% to about 90%.

13. The liquid crystal display device of claim 11, wherein the alignment layer includes a polyimide-based polymer resin, and the portion of the alignment layer adjacent to the liquid crystal layer further comprises a reactive mesogen.

14. The liquid crystal display device of claim 13, wherein the portion of the alignment layer adjacent to the liquid crystal layer comprises a pattern comprising a plurality of islands.

15. A method of manufacturing a liquid crystal display device, comprising:

forming an electrode on each of two substrates;

coating an alignment layer composition comprising a polyimide-based polymer resin on the electrode to form a preliminary alignment layer, wherein the polyimide-based polymer resin has an imidization ratio of about 65% to about 90%;

thermally treating the preliminary alignment layer to form an alignment layer, wherein the alignment layer is phase-separated into a vertical alignment layer and a tilting alignment layer, wherein the vertical alignment layer is adjacent to the electrode and the tilting alignment layer is spaced apart from the electrode, and wherein the tilting alignment layer comprises a pattern comprising a plurality of islands;

forming a liquid crystal layer between the two substrates, wherein the liquid crystal layer comprises liquid crystal molecules; and aligning the liquid crystal molecules.

16. The method of claim 15, wherein an imidization ratio of the alignment layer composition is about 75% to about 90%.

17. The method of claim 15, wherein the forming of the liquid crystal layer comprises dropping a liquid crystal composition on the alignment layer formed on one of the two substrates.

18. The method of claim 15, wherein the aligning of the liquid crystal molecules comprises performing at least one of exposure to an ultraviolet light and a generation of an electrical field.

* * * * *